United States Patent
Sakai et al.

(10) Patent No.: US 7,777,848 B2
(45) Date of Patent: Aug. 17, 2010

(54) MANUFACTURING METHOD OF LIQUID CRYSTAL PANEL AND DEUTERIUM OXIDE SURFACE TREATMENT METHOD OF ALIGNMENT FILM

(75) Inventors: Akira Sakai, Kawasaki (JP); Nobuo Kawase, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 685 days.

(21) Appl. No.: 11/680,074

(22) Filed: Feb. 28, 2007

(65) Prior Publication Data

US 2007/0206151 A1 Sep. 6, 2007

(30) Foreign Application Priority Data

Mar. 2, 2006 (JP) .............................. 2006-055973

(51) Int. Cl.
 *G02F 1/1337* (2006.01)
 *G02F 1/141* (2006.01)
(52) U.S. Cl. ..................... 349/123; 349/124; 349/125; 349/135; 349/187
(58) Field of Classification Search ............... None
See application file for complete search history.

(56) References Cited

U.S. PATENT DOCUMENTS

| | | | |
|---|---|---|---|
| 5,270,844 A | 12/1993 | Maruyama et al. | 359/79 |
| 5,321,538 A | 6/1994 | Maruyama et al. | 359/79 |
| 2002/0063830 A1* | 5/2002 | Callegari et al. | 349/124 |
| 2005/0011861 A1 | 1/2005 | Choo et al. | |
| 2005/0062921 A1* | 3/2005 | Gao et al. | 349/130 |
| 2005/0089720 A1* | 4/2005 | Imanishi | 428/690 |
| 2005/0117100 A1* | 6/2005 | Terashita et al. | 349/129 |
| 2005/0157225 A1* | 7/2005 | Toyooka et al. | 349/99 |
| 2005/0186135 A1* | 8/2005 | Howes | 424/1.11 |
| 2006/0079492 A1* | 4/2006 | Ahlem et al. | 514/178 |
| 2006/0286701 A1* | 12/2006 | Moon et al. | 438/30 |
| 2007/0037413 A1* | 2/2007 | Ishihara et al. | 438/792 |

FOREIGN PATENT DOCUMENTS

| | | |
|---|---|---|
| JP | 11-013562 | 1/1999 |
| JP | 11-260913 | 9/1999 |
| JP | 2004-310037 | 11/2004 |
| JP | 2005-062877 | 3/2005 |

\* cited by examiner

*Primary Examiner*—Andrew Schechter
*Assistant Examiner*—Dennis Y Kim
(74) *Attorney, Agent, or Firm*—Fitzpatrick, Cella, Harper & Scinto

(57) ABSTRACT

In order to improve the state of image irregularities of a liquid crystal panel, a plasma treatment is performed for an alignment film using a treatment gas such as hydrogen and/or deuterium, or a surface treatment is performed in which an alignment film is immersed in deuterium oxide. As a result, moisture contained in the alignment film is removed, and re-adsorption of moisture is also suppressed, thereby reducing image irregularities.

2 Claims, 4 Drawing Sheets

MANUFACTURING METHOD OF LIQUID CRYSTAL PANEL AND DEUTERIUM OXIDE SURFACE TREATMENT METHOD OF ALIGNMENT FILM

This application claims the benefit of Japanese Application No. 2006-055973, filed Mar. 2, 2006, which is hereby incorporated by reference in its entirety.

BACKGROUND OF THE INVENTION

1. Field of the Invention

The present invention relates to a manufacturing method of a liquid crystal panel and a surface treatment method of an alignment film, and more particularly, relates to a surface treatment method for suppressing alignment defects which cause image irregularities of liquid crystal display devices.

2. Description of the Related Art

An electronic device called liquid crystal on silicon (LCOS) which is represented by an active matrix liquid crystal display panel is generally manufactured by sequentially performing many treatment processes on a substrate, such as oxide, silicon, sapphire, or glass. The treatment processes, for example, may include cleaning, thin-film formation, etching, ion implantation, thermal processing, porous film formation, alignment film formation, application of liquid crystal sealing agent, and liquid crystal injection.

In general, all the treatment processes are performed in respective manufacturing apparatuses which are disposed in a clean room. In the treatment processes, when semiconductor substrates are transported from one process to another process, the substrates are exposed to the atmosphere in the clean room. A manufacturing method of an active matrix liquid crystal display panel has been disclosed.

In addition, in order to remove moisture in a semiconductor device manufacturing process, a method has been disclosed in Japanese Patent Laid-Open Nos. 2004-310037 and 2005-62877 in which a substrate is irradiated with a noble gas or a hydrogen active species.

However, in a liquid crystal panel manufactured in accordance with a method of the related art, image irregularities were generated in some cases. In particular, as a liquid crystal projector application, when the liquid crystal panel was continuously irradiated with intensive light, apparent image irregularities sometimes occurred after the panel was used for a long period of time.

According to intensive research and consideration carried out by the inventors of the present invention, it is believed that moisture which adheres to an alignment film aligning liquid crystal molecules is one of the reasons causing image irregularities of a liquid crystal panel.

For example, when a solid substance is exposed to the atmosphere of a clean room, it adsorbs moisture in the clean room on the surface thereof quickly. In a liquid crystal panel, oxide, such as a silicon oxide, which is formed by oblique deposition, is sometimes used as an inorganic alignment film. In this case, the inorganic alignment film quickly adsorbs moisture in the atmosphere when it is recovered from a deposition vacuum chamber. In particular, since the oblique deposition film is a film which is grown in an oblique direction with respect to a substrate, the influence of moisture adsorption as described above is considerable. As a result, the adsorbed moisture desorbs as steam in a subsequent step and then diffuses into the liquid crystal, resulting in image irregularities and degradation in light durability and the like.

As described above, it was found that moisture molecules, which adsorb on the inorganic alignment film, variously affect the properties of a liquid crystal device and are partly responsible for causing image irregularities. In addition, it was also found that, after the process for forming this alignment film is finished, the adsorption of moisture must be suppressed.

SUMMARY OF THE INVENTION

The present invention provides a manufacturing method of a liquid crystal panel, which can efficiently remove moisture contained in an alignment film formed by oblique deposition using an inorganic material or the like and which can also prevent re-adsorption of moisture, and a surface treatment method of an alignment film.

A first aspect of the present invention provides a method for manufacturing a liquid crystal panel, including the steps of preparing two substrates having an alignment film on at least one surface thereof, and disposing a liquid crystal between the two substrates. In the above manufacturing method, a surface treatment step is performed in which the alignment film is exposed to an atmosphere containing at least one component selected from the group consisting of deuterium, hydrogen deuteride, and tritium, and after the surface treatment, the liquid crystal is brought into contact with the alignment film.

A second aspect of the present invention provides a method for manufacturing a liquid crystal panel, including the steps of preparing two substrates having an alignment film on at least one surface thereof, and disposing a liquid crystal between the two substrates. In the manufacturing method described above, a surface treatment step is performed in which the alignment film is exposed to deuterium oxide, and after the surface treatment, the liquid crystal is brought into contact with the alignment film.

A third aspect of the present invention provides a method for performing a surface treatment of an alignment film, including the step of exposing the alignment film to an atmosphere containing at least one component selected from the group consisting of deuterium, hydrogen deuteride, and tritium.

A fourth aspect of the present invention provides a method for performing a surface treatment of an alignment film, including the step of exposing the alignment film to deuterium oxide.

In the above surface treatment step according to the present invention, the step can be performed at a pressure preferably in the range of 50 to 400 Pa.

According to still another aspect, the present invention is directed to a liquid crystal panel comprising two substrates having an alignment film on at least one surface thereof and a liquid crystal between the two substrates, where the liquid crystal panel is formed by performing the steps of (a) preparing the two substrates having an alignment film on at least one surface thereof; (b) performing a surface treatment in which an alignment film is exposed to (i) deuterium oxide or (ii) an atmosphere containing at least one component selected from the group consisting of deuterium, hydrogen deuterium, and tritium, whereby moisture adsorbed by the alignment film is removed and further adsorption of moisture is inhibited; and (c) bringing the liquid crystal into contact with the alignment film.

In addition, the alignment film can be an inorganic alignment film formed by oblique deposition. The reason for this is that this alignment film is likely to adsorb water, and in addition, water can be easily removed by the method according to the present invention. Furthermore, transistors can also be formed under the alignment film. The reason for this is that, at the same time as water is removed, dangling bonds present on gate insulating film interfaces of transistors and on semiconductor layer surfaces can be terminated by the surface treatment according to the present invention.

In the above methods according to the present invention, the following configurations are included as preferable embodiments. The inorganic alignment film can be formed by oblique deposition. The inorganic alignment film is a silicon oxide film as an inorganic metal compound. The inorganic alignment film is provided on a transparent conductive film formed on a glass substrate. The inorganic alignment film is provided at least on a reflection layer, which is a metal atomic layer, formed on a silicon substrate.

According to one embodiment of the present invention, moisture contained in an alignment film is efficiently removed, and when at least one of deuterium, hydrogen deuteride, and tritium is contained in the alignment film, re-adsorption of moisture can be prevented. Hence, an alignment film which has a small water content and which is not likely to re-adsorb moisture can be provided, and in an electronic device using the above alignment film, that is, in a liquid crystal panel, the state of image irregularities and the durability can be improved.

Further features of the present invention will become apparent from the following description of exemplary embodiments with reference to the attached drawings.

DESCRIPTION OF THE EMBODIMENTS

First Embodiment

Hereinafter, with reference to the figures, preferable embodiments according to the present invention will be described. In order to facilitate the understanding of the present invention, the case in which hydrogen and/or deuterium is used will be described.

Figure 1:
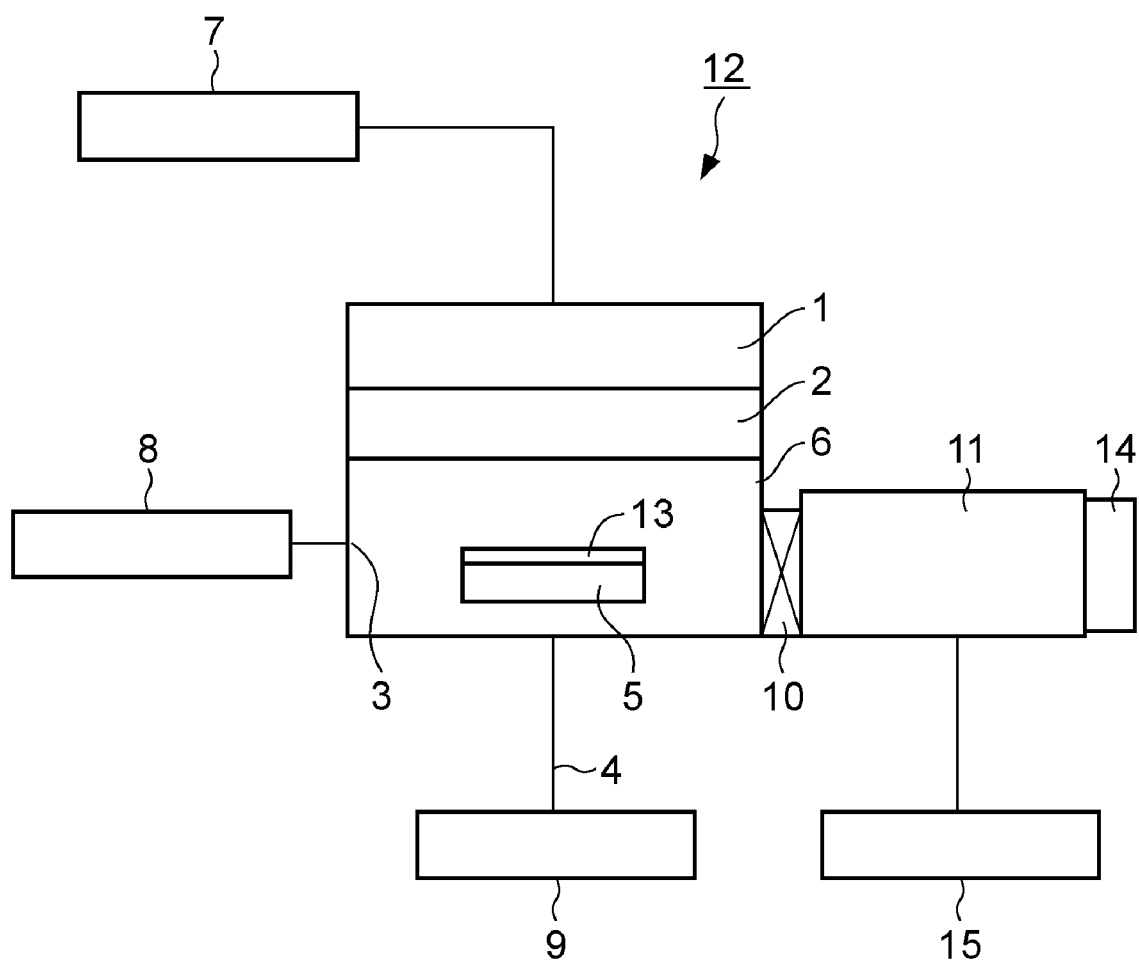
FIG. 1 is a schematic cross-sectional view of an example of a treatment apparatus performing a first treatment method according to the present invention.

FIG. 1 is a schematic cross-sectional view of an example of a treatment apparatus performing a first treatment method according to the present invention. A treatment apparatus 12 is formed of two air-tight chambers, that is, one chamber is a treatment chamber 6 receiving a substrate 13, and the other chamber is a load lock chamber 11 provided at the front side of the treatment chamber 6.

A gate valve 10 is provided between the treatment chamber 6 and the load lock chamber 11.

The substrate 13 provided with an inorganic alignment film on the surface thereof is transported to the load lock chamber 11 under atmospheric pressure by a transportation device (not shown). In this transportation, the substrate 13 is transported to the load lock chamber 11 from a carrier cassette or the like through an access device 14 such as a gate valve (not shown). In addition, during the transportation, the gate valve 10 is closed, and hence the inside of the treatment chamber 6 is placed in an approximately vacuum state.

Subsequently, the load lock chamber 11 receiving the substrate 13 is tightly closed and is then evacuated to a predetermined pressure by an evacuation device 15. Then, the substrate 13 is transported to the treatment chamber 6 by a transportation device (not shown) in vacuum via the gate valve 10.

The treatment chamber 6 has a gas supply device 8, a gas inlet 3, an exhaust line 4, an exhaust device 9, a heater stage 5, a microwave generator 7, a microwave guide 1, and a microwave transmission window 2.

Using the gas supply device 8 and the gas inlet 3, a treatment gas is controlled to flow at a desired flow rate and is then supplied in the treatment chamber 6. As the treatment gas, deuterium ($D_2$), hydrogen deuteride (HD), and tritium may be used alone or in combination of at least two of the above four. In particular, deuterium or hydrogen deuteride is preferably used. In addition, the above treatment gas may be used after being diluted to a concentration of 10 volume percent with an inert gas such as neon or xenon, and/or hydrogen ($H_2$).

The exhaust line 4 discharges the treatment gas outside, which was supplied in the treatment chamber 6.

The exhaust device 9 controls the pressure inside the treatment chamber 6 to a desired value based on a measurement result by a pressure sensor (not shown). The exhaust device 9 includes, for example, a conductance valve, a vacuum pump, and a shut valve.

The heater stage 5 is provided to receive and heat the substrate 13 when it is treated and can maintain the substrate 13 at a desired temperature. In the present invention, the temperature of the heater stage 5 is controlled in the range of room temperature to 400° C. and preferably in the range of room temperature to 300° C.

The microwave generator 7 generates microwaves to excite a treatment gas for plasmarization. Although in this embodiment the treatment gas is plasmarized, when the treatment is performed in an atmosphere of a treatment gas which is excited by a different method, the same effect as described above can also be obtained.

The microwave guide 1 and the microwave transmission window 2 guide microwaves into the treatment chamber 6. The microwave transmission window 2 is formed of a dielectric material, such as quartz glass, alumina, or aluminum nitride.

The substrate 13 transported into the treatment chamber 6 is heated to a predetermined temperature on the heater stage 5. In addition, the substrate 13 is treated under a predetermined pressure with plasma of a treatment gas, which contains deuterium or hydrogen and deuterium, excited by microwaves. The above pressure is preferably in the range of 50 to 400 Pa. When the pressure is less than 50 Pa, hydrogen and/or deuterium ions, which have high energy in the plasma, are likely to reach the substrate 13. On the other hand, when the pressure is more than 400 Pa, active species of deuterium are not likely to reach the substrate 13, and hence the efficiency of moisture removal is considerably degraded.

In the plasma treatment according to the present invention, surface wave plasma generated by microwaves is preferably used. As a result, since high density plasma is obtained, and high density deuterium active species are supplied, an efficient moisture removal treatment can be performed.

In the present invention, plasma treatment apparatuses, each of which have an airtight chamber receiving the substrate 13 and which are used for semiconductor manufacturing processes, may be used. For example, a plasma CVD apparatus used in a thin-film forming step may be applied. Alternatively, a plasma etching apparatus used in an etching step may also be applied.

In this embodiment, although a single-wafer type treatment apparatus having the load lock chamber 11 is used, the apparatus is not limited thereto. For example, the structure may be formed in which the load lock chamber 11 is not provided, and in which the treatment chamber 6 is directly placed in the atmosphere and in an approximately vacuum condition in an alternate manner. Alternatively, the structure in which a plurality of the substrates 13 is simultaneously treated in the treatment chamber 6 may be formed.

According to the present invention, an oxide film formed by oblique deposition can be efficiently dehydrated even when the treatment temperature is room temperature.

Figure 2:
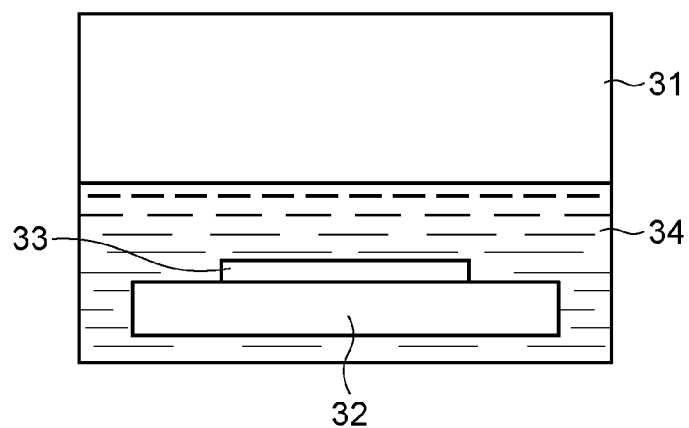
FIG. 2 is a schematic cross-sectional view of an example of a treatment apparatus performing a second treatment method according to the present invention.

FIG. 2 is a schematic cross-sectional view of an apparatus performing a second treatment method according to the present invention. This apparatus has a deuterium oxide ($D_2O$) bath 31, and in this bath 31, a heater stage 32, which can optionally control the temperature of the bath, is provided. The heater stage 32 has a mechanism in which the temperature is controlled to a desired temperature by an electric source and a temperature control circuit (not shown). In addition, the heater stage 32 may be provided with a function (not shown), such as ultrasonic vibration, so that the efficiency of immersion in deuterium oxide ($D_2O$) can be improved by applying energy to a substrate 33.

The substrate 33 provided with an inorganic alignment film on the surface thereof, which is to be dehydrated, is immersed in a deuterium oxide ($D_2O$) bath solution 34 filled in the bath 31. The time for the immersion and the temperature of the $D_2O$ solution 34 may be selected as desired. The solution temperature for the immersion under the atmospheric pressure is preferably 0 to 100° C. and more preferably 20 to 95° C. The time for the immersion is preferably in the range of 0.1 seconds to 48 hours and more preferably in the range of 2 seconds to 24 hours. The concentration for the immersion with respect to pure water is preferably 1 to 100 volume percent and more preferably 20 to 100 volume percent. After the immersion in the deuterium oxide, liquid droplets are removed by blowing a $N_2$ gas onto the surface of the inorganic alignment film.

Even when the inorganic alignment film is immersed in the deuterium oxide solution as described above, a dehydration treatment can be performed as is the case of the inorganic alignment film processed by the above plasma treatment.

Figure 3:
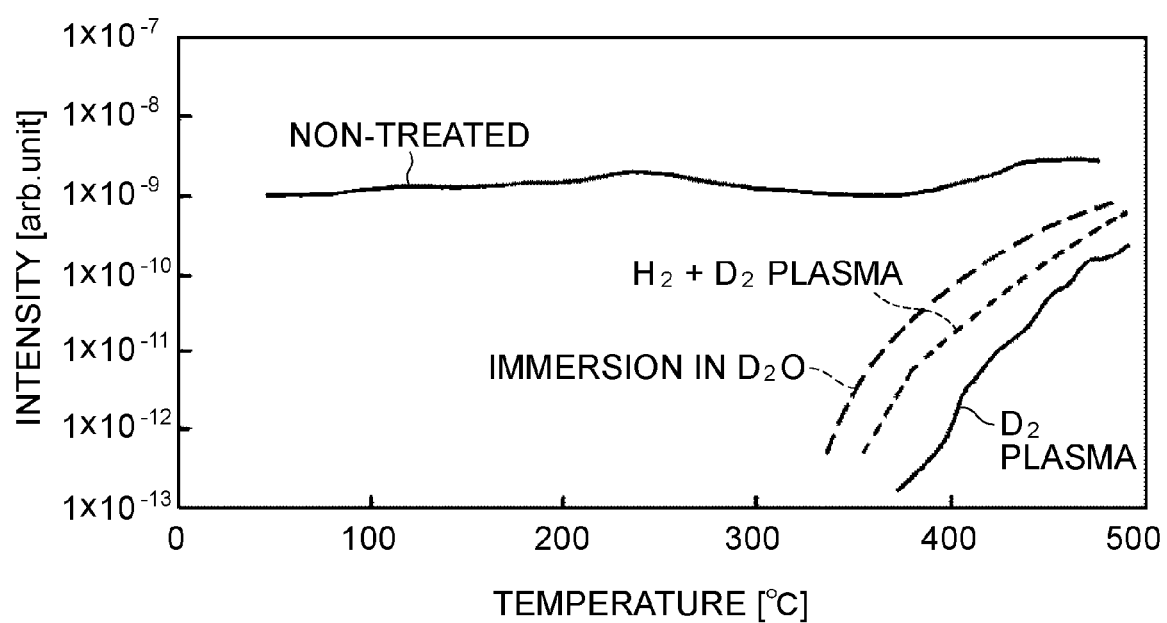
FIG. 3 is a graph showing dehydration effects of various treatment methods.

FIG. 3 shows the results of the first treatment (plasma treatment) and the second treatment (immersion in $D_2O$), according to the present invention, besides the result of non-treatment.

In general, in a thermal differential spectroscopic (TDS) analysis, a sample is heated at a predetermined rate in vacuum, and desorption gases are then measured by a mass analyzer. Accordingly, as for a gas species having a specific molecular weight, the temperature dependence of a desorption amount (relative value) can be measured. FIG. 3 shows the results obtained when a water molecule (molecular weight of 18) was measured.

In general, when the desorption data of a water molecule (molecular weight of 18) of a silicon oxide formed by oblique deposition is measured, the information of surface adsorption water from room temperature to approximately 300° C. can be obtained.

As shown in FIG. 3, water desorption from silicon oxide films processed by a deuterium plasma treatment, and an immersion treatment in deuterium oxide is not observed at all from room temperature to approximately 300° C. as compared to that from a non-treated silicon oxide film. From these results, it is apparent that the deuterium plasma treatment, and the immersion treatment in deuterium oxide (this is also one type of surface treatment) can efficiently remove adsorption water on the oxide film surface.

In particular, although a substrate provided with a silicon oxide film treated by deuterium was held in a clean room over two months after the treatment, the TDS spectrum had the same tendency as that obtained before. Accordingly, it was found that the above moisture-adsorption preventing effect lasts for a significantly long time. Hence, as the surface treatment of alignment films in mass production, the treatment by deuterium is preferable.

By the first or the second treatment of the present invention, besides primary constituent elements forming the alignment film, the alignment film according to the present invention contains at least deuterium. The content of the deuterium can be considerably changed in the range of $1\times10^{12}$ to $1\times10^{22}$ ($cm^{-3}$) in accordance with the shape of the inorganic alignment film. The deuterium may be terminated by dangling bonds of primary constituent elements, which are generated on surfaces, in the vicinity thereof, in defects, and in spaces to which moisture of the inorganic alignment film is adsorbed, to form hydrogen bonds and/or deuterium bonds.

In addition, for the inorganic alignment film of the present invention, silicon nitride, silicon oxide, or silicon oxynitride may be used, and in particular, a compound containing silicon and at least an oxygen atom (O) is preferable.

The inorganic alignment film according to the present invention is a film having a columnar structure, and the columnar growth direction may be perpendicular or inclined to the substrate. In addition, the inorganic alignment film may be a film in which planar layers are overlapped with each other and are aligned, and the planar layers may be disposed perpendicular or inclined to the substrate.

The surface structure of the inorganic alignment film according to the present invention may have an irregular shape in conformity with the cross-sectional structure described above. In addition, in order to reduce the irregularities, planarization may be performed by polishing.

The inorganic alignment film according to the present invention may be a porous film having a plurality of pores therein. The porous film according to the present invention is classified by the size of pores, and a film having pores of less than 2 nm, a film having pores in the range of 2 nm to 50 nm, and a film having pores of more than 50 nm are called a microporous film, a mesoporous film, and a macroporous film, respectively.

As defined by IUPAC, the pores forming the mesoporous film indicates pores having a diameter in a meso region of 2 nm to 50 nm, as described above. In addition, in the pore diameter distribution evaluated by the Berret-Joyner-Halenda (BJH) method from an adsorption isotherm which is obtained by a gas adsorption method, 60% or more of pores is included within a range of 10 nm. The range of 10 nm indicates the range in which the difference between the maximum and the minimum is 10 nm, for example, in which the maximum and the minimum are 15 nm and 5 nm, respectively.

A device using the inorganic alignment film according to the present invention will be particularly described.

Figure 4:
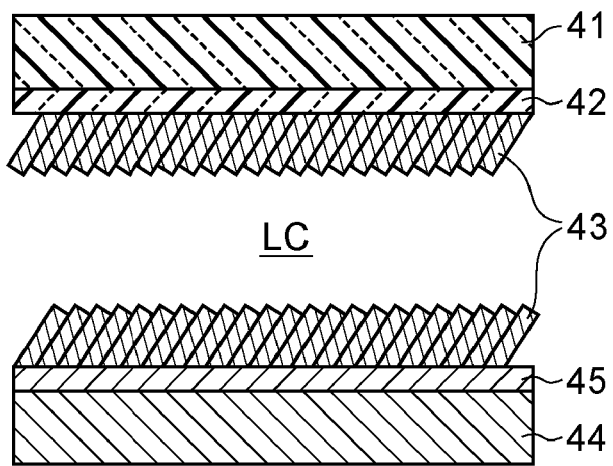
FIG. 4 is a schematic cross-sectional view of an example of a liquid crystal panel using an inorganic alignment film according to the present invention.

FIG. 4 is a schematic cross-sectional view of a liquid crystal panel using the inorganic alignment film of the present invention formed by oblique deposition. A sealing member (sealing material) provided along the periphery of the substrate is not shown.

As shown in this figure, an inorganic alignment film 43 has a columnar structure, and a growth angle of the columnar structure can be evaluated by a SEM cross-section observation. When the inorganic alignment film 43 thus formed is processed by the treatment according to the present invention, the presence of deuterium atoms can be confirmed by a SIMS analysis.

As a glass substrate 41 in FIG. 4, a material may be optionally selected, for example, from a quartz glass, a non-alkali glass, and an inexpensive soda-lime glass in accordance with the specification, that is, in accordance with desired optical properties, of a liquid crystal device.

In view of surface properties and electrical properties, an ITO film 42 may have a thickness in the range of 10 to 200 nm and preferably 15 to 100 nm.

The inorganic alignment film 43 of the present invention may be formed by performing vacuum deposition (or vacuum evaporation) of silicon oxide while the substrate is inclined.

An oblique deposition film of silicon oxide having a columnar structure is obtained by the vacuum deposition. The film structure of an oblique deposition film can be controlled by an incident angle.

Figure 5:
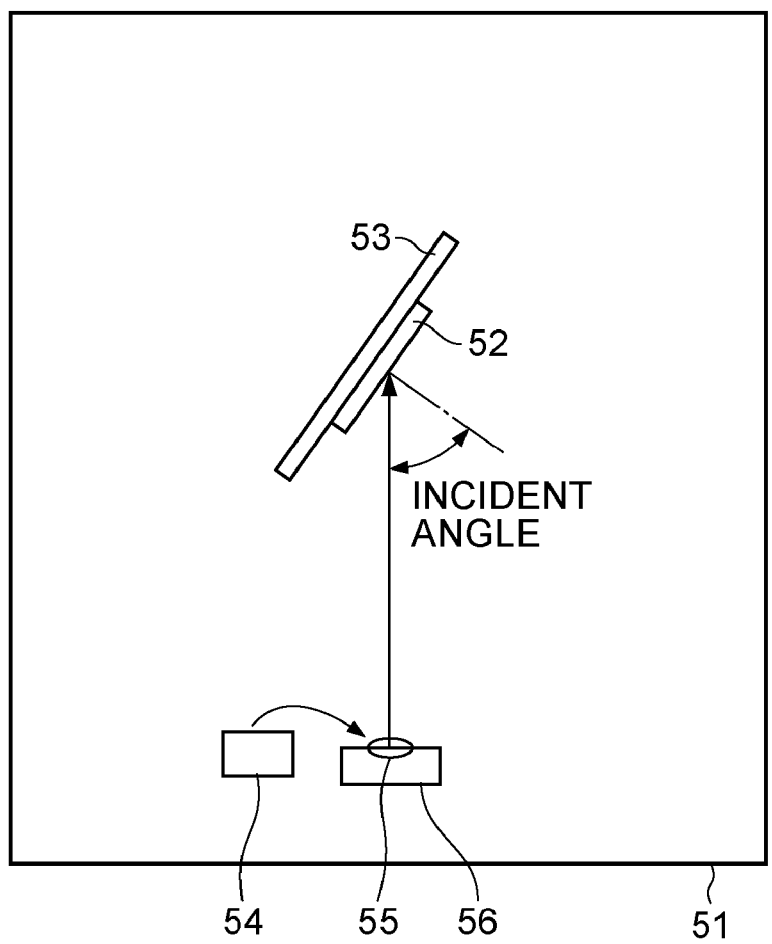
FIG. 5 is a schematic cross-sectional view of an oblique deposition apparatus.

FIG. 5 is a schematic view showing the structure of an oblique deposition apparatus. The incident angle is defined as an angle between the normal of a substrate 52 and an incoming direction thereto from a deposition source 55. Reference numeral 53 indicates a substrate holder which can hold and heat the substrate 52.

When the inorganic alignment film of the present invention is formed of an oblique deposition film, the incident angle may be set in the range of 30° to 85° and preferably 40° to 80° in accordance with various properties necessary for liquid crystal orientation. In particular, since having a strong relationship with a pretilt angle of the liquid crystal orientation, the incident angle is a very important parameter to design element properties of a liquid crystal panel.

On a silicon substrate 44, for example, a liquid crystal panel drive semiconductor circuit is formed. That is, the silicon substrate 44 is a semiconductor substrate having single crystal silicon transistors disposed in a matrix at the surface side. Alternatively, instead of the silicon substrate 44, a glass substrate having non-single crystal transistors disposed in a matrix may also be used. A reflection film 45 is also used as an electrode, and in this embodiment, a metal layer made of aluminum or an aluminum alloy may be used. In the case of a vertical orientation mode, a liquid crystal material having negative dielectric anisotropy is used as a liquid crystal LC. The liquid crystal of the present invention is not limited to a liquid crystal having a vertical orientation mode, and a liquid crystal having an orientation mode called an in-plane switching (IPS) mode or a twisted nematic (TN) mode may also be used.

Figure 6:
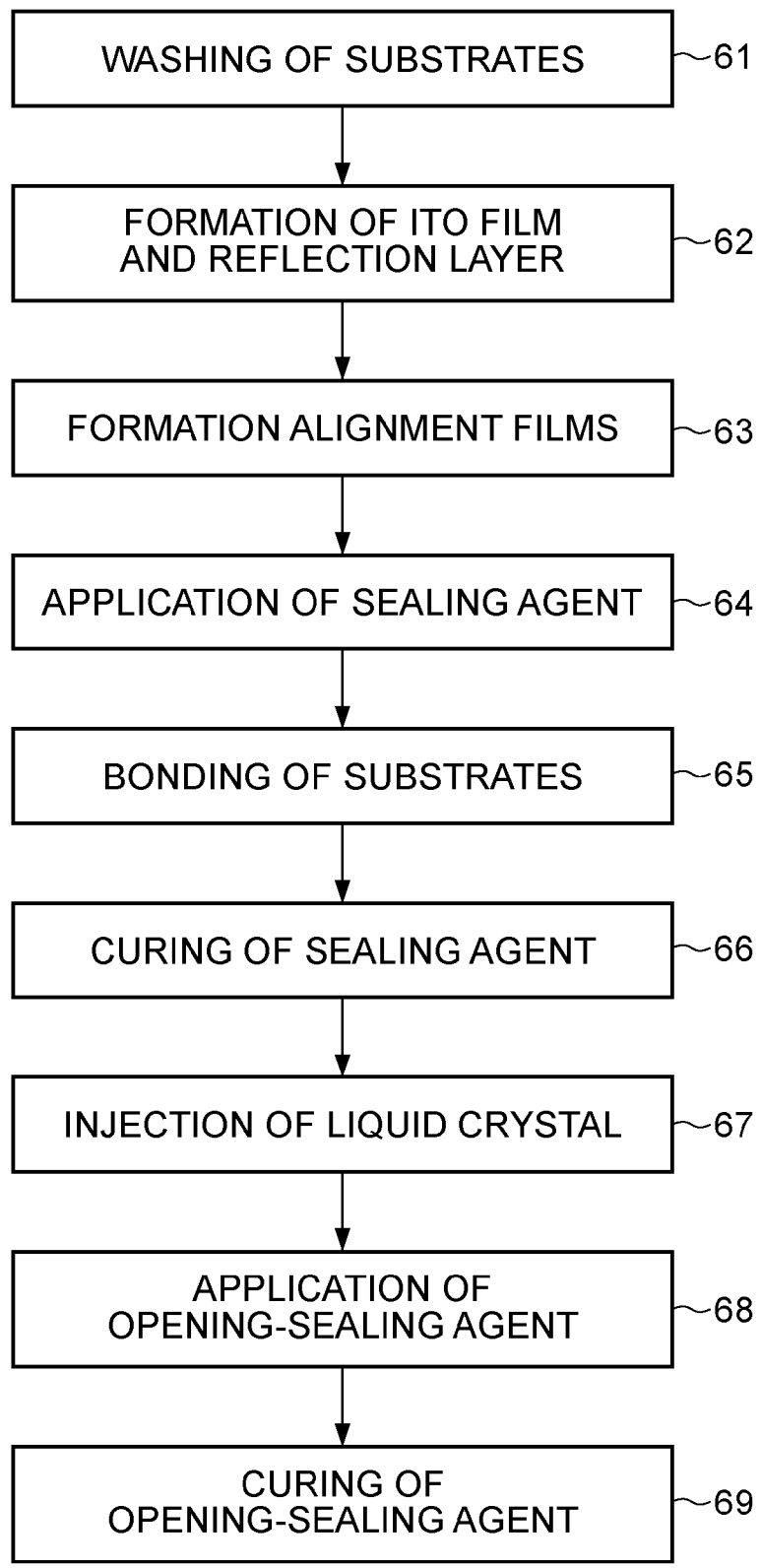
FIG. 6 is a flowchart illustrating a manufacturing process of a liquid crystal panel.

In a manufacturing process of a liquid crystal panel, after an oblique deposition film of silicon oxide or the like is formed as the inorganic alignment film, when the above surface treatment is performed, degradation in light durability of a liquid crystal device, which is caused by contamination of the inorganic alignment film with moisture, can be significantly suppressed. FIG. 6 is a flowchart of a process for manufacturing a common liquid crystal panel. Hereinafter, individual steps will be described with reference to a process for manufacturing the liquid crystal panel shown in FIG. 4 by way of example.

First, after the substrates 41 and 44 are washed (step 61), the ITO film 42 used as a transparent electroconductive film is formed on the substrate 41, and the reflection film 45 is formed on the other substrate 44 (step 62). Next, in a vacuum container 51 shown in FIG. 5, approximately 100 layers of $SiO_2$ are formed by an oblique deposition method as the inorganic alignment film 43. A nitrogen supply mechanism (not shown) provided for the vacuum container 51 supplies nitrogen therein, so that the pressure in the vacuum container 51 is returned to the atmospheric pressure. Subsequently, the substrates 41 and 44 each provided with the oblique deposition film are recovered.

In general, in view of performance stability of the device, the steps described above are preferably performed under clean conditions, such as in a clean room, in which the control of temperature and humidity is performed. Subsequently, as shown in FIG. 1, the substrates 41 and 44 are placed in the microwave plasma generator (treatment apparatus) 12 and are then processed by deuterium plasma treatment. Alternatively, the substrates 41 and 44 are immersed in the bath 31 of deuterium oxide shown in FIG. 2, so that the surface treatment of the inorganic alignment films is performed. As described above, at an appropriate timing after an alignment film forming step 63 and before a liquid crystal injection step 67, the surface treatment according to the present invention is performed, so the a dehydration treatment (surface treatment step of the present invention) of the inorganic alignment film 43 is performed.

Next, a sealing agent is applied along the periphery of one of the substrates (step 64), and the substrates 41 and 44 are disposed to face each other with a predetermined distance therebetween so that the alignment films 43 are placed inside (step 65). Subsequently, a step of curing the sealing agent (step 66) is performed, for example, by irradiation of predetermined ultraviolet rays when a UV curing type sealing agent is used or by heat application when a thermosetting type sealing agent is used, so that bonding of the substrates is completed. An opening is formed in the sealing agent, and a liquid crystal is injected through this opening by a vacuum liquid crystal injector (step 67). After the injection of the liquid crystal is completed, an opening sealing agent is applied to the opening (step 68) and is then cured by a curing process, such as UV irradiation, in a step 69, thereby forming the liquid crystal panel.

In the present invention, a drip injection method may also be used in which after the inorganic alignment films are surface-treated, a liquid crystal is dripped on one of the substrates and is then sandwiched with the other substrate, followed by sealing along the peripheries of the substrates. In addition, in the present invention, from the surface treatment of the inorganic alignment films to the step of sandwiching the liquid crystal between the substrates, the inorganic alignment films processed by the surface treatment are preferably not to be irradiated with ultraviolet rays or rays having a wavelength shorter than that. That is, after the surface treatment of the inorganic alignment films is performed and before the liquid crystal is brought into contact therewith, it is preferable that the surfaces of the inorganic alignment films be at least shielded from ultraviolet rays and rays having a wavelength shorter than that.

EXAMPLES

Example 1

After a liquid crystal panel was formed in accordance with the flowchart shown in FIG. 6, a light durability test of the liquid crystal panel was performed. The surface treatment conditions for an inorganic alignment film and the results of the light durability test are shown in Table 1.

As a comparative example, after the formation of oblique deposition films, a liquid crystal panel using oblique deposition films, which were not processed by plasma treatment, was formed.

The light durability test for the liquid crystal panel was performed under a condition in which the light intensity was higher than that in which a common product was used, and image irregularities of the liquid crystal panel could be confirmed by microscope observation.

In the light durability test of this example, the panel temperature was held at 70° C., and continuous irradiation of white light at 10 W/cm$^2$ was performed. The time at which image irregularities were not generated by the continuous irradiation was measured, and a time of 1,000 hours or more, 800 hours or more, and less than 800 hours were represented by ◎, ○, and ×, respectively.

As a result, it was found that the liquid crystal panel formed by the treatment method of this example has excellent light durability, and that a liquid crystal device has high performance stability.

When a plasma treatment is performed using HD instead of $D_2$, the same result as described above can also be obtained. Accordingly, as apparent from the results of the light durability test, the durability of the liquid crystal panel according to the present invention, which is formed by using the treatment method of the present invention, can be significantly improved.

TABLE 1

|  | Gas Flow Rate (sscm) | Pressure (Pa) | MW power (W) | Treatment Time (min) | Light Durability |
| --- | --- | --- | --- | --- | --- |
| Comparative Example | No | No | No | No | ○ |
| $H_2 + D_2$ | 200 | 100 | 500 | 2 | ◎ |
| $D_2$ | 200 | 100 | 500 | 2 | ◎ |
| HD | 200 | 100 | 500 | 2 | ◎ |

Example 2

A liquid crystal panel was formed in a manner similar to that in Example 1 except that, as a dehydration treatment of the inorganic alignment film, immersion in deuterium oxide was performed instead of the plasma treatment. The treatment conditions and the results of the light durability test are shown in Table 2.

TABLE 2

|  | Immersion Condition | Immersion Time (min) | Light Durability |
| --- | --- | --- | --- |
| Comparative Example | No | No | ○ |
| Immersion in $D_2O$ | 60° C. | 5 | ◎ |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A method for manufacturing a liquid crystal panel, comprising the steps of:
    preparing two substrates having an alignment film on at least one surface thereof; and
    disposing liquid crystal between the two substrates,
    wherein before said disposing step a surface treatment step is performed in which the alignment film is exposed to deuterium oxide solution, and after the surface treatment, the liquid crystal is brought into contact with the alignment film, and
    wherein a concentration of the deuterium oxide with respect to a solvent in the solution is more than 1 volume percent and less than 100 volume percent.

2. The method for manufacturing a liquid crystal panel, according to claim 1, further comprising a step of forming transistors on at least one of the substrates.

* * * * *